United States Patent [19]

Khouri et al.

[11] Patent Number: 5,222,083
[45] Date of Patent: Jun. 22, 1993

[54] CALL PROGRESS MONITORING

[75] Inventors: Joseph F. Khouri, San Jose; Andrew S. Crowe, Sunnyvale; Daniel T. Lai, Los Altos, all of Calif.

[73] Assignee: ROLM Company (Formerly ROLM Systems), Santa Clara, Calif.

[21] Appl. No.: 852,594

[22] Filed: Mar. 17, 1992

[51] Int. Cl.$^5$ .................................. H04M 3/22
[52] U.S. Cl. ..................... 379/23; 379/27; 379/29; 379/34
[58] Field of Search .............. 379/34, 23, 29, 27, 379/32

[56] References Cited

U.S. PATENT DOCUMENTS 4,165,450 8/1979 Throop et al. .................. 379/23

Primary Examiner—Stafford Schreyer
Attorney, Agent, or Firm— Einschlag

[57] ABSTRACT

Method for use in developing, testing, debugging, and/or troubleshooting a call progress monitoring (CPM) detection system which is utilized, for example, by a voice messaging system (VMS). One embodiment of the present invention which is utilized in conjunction with a VMS includes the steps of: (a) monitoring at least one voice channel of the VMS to obtain CPM tones and having a CPM Detection system associated with the VMS perform an analysis of the CPM tones, the output of which analysis is referred to as CPM Trace Variables; (b) storing the CPM tones and the CPM Trace Variables for the at least one voice channel, which stored CPM tones and CPM Trace Variables are referred to as a CPM Trace file; (c) obtaining a first voice channel; and (d) feeding the voice portion of the CPM Trace file to a second voice channel for playing it to the first voice channel.

7 Claims, 3 Drawing Sheets

| CPM TONES | CPM TRACE VARIABLES |
|---|---|
| CPM TONES | CPM TRACE VARIABLES |
| ⋮ | ⋮ |
| CPM TONES | CPM TRACE VARIABLES |

FIG. 4

| START | LENGTH | TONE TYPE |
|---|---|---|
| 0.00 | ——— | CPM STARTED    MODE = DIAL TONE    TIMEOUT = 30 SECONDS |
| 3.26 | ——— | CPM STOPPED ON DIAL TONE FOUND FROM DIAL TONE MACHINE |
| 0.00 | ——— | CPM STARTED    MODE = TONE ANSWER   TIMEOUT = 30 SECONDS |
| 37.16 | ——— | CPM STOPPED ON TONE SILENCE FROM PAGER MACHINE |

| START | |
|---|---|
| 0.00 | CPM STARTED    MODE = DIAL TONE    TIMEOUT = 30 SECONDS |
| 3.26 | CPM STOPPED ON DIAL TONE FOUND FROM DIAL TONE MACHINE |
| 0.00 | CPM STARTED    MODE = TONE ANSWER   TIMEOUT = 30 SECONDS |
| 3.26 | RNA MACHINE CHANGED FROM START TO RING ON |
| 9.09 | RNA MACHINE CHANGED FROM RING ON TO RING OFF |
| 14.91 | RNA MACHINE CHANGED FROM RING OFF TO RING ON |
| 17.22 | RNA MACHINE CHANGED FROM RING ON TO RING OFF |
| 19.84 | PAGER MACHINE CHANGED FROM START TO TONE ON |
| 27.58 | PAGER MACHINE CHANGED FROM TONE ON TO TONE OFF |
| 37.18 | CPM STOPPED ON TONE SILENCE FROM PAGER MACHINE |

| START | LENGTH | TONE TYPE |
|---|---|---|
| 0.00 | ——— | CPM STARTED    MODE = DIAL TONE    TIMEOUT = 30 SECONDS |
| 0.00 | 3.20 | SILENCE |
| 3.20 | 0.06 | DIAL TONE |
| 3.26 | ——— | CPM STOPPED ON DIAL TONE FOUND FROM DIAL TONE MACHINE |
| 0.00 | ——— | CPM STARTED    MODE = TONE ANSWER   TIMEOUT = 30 SECONDS |
| 0.00 | 3.20 | SILENCE |
| 3.20 | 5.82 | RING |
| 9.02 | 5.82 | SILENCE |
| 14.85 | 2.30 | RING |
| 17.15 | 2.62 | SILENCE |
| 19.78 | 7.74 | SINGLE FREQ |
| 27.52 | 9.66 | SILENCE |
| 37.18 | ——— | CPM STOPPED ON TONE SILENCE FROM PAGER MACHINE |

CALL PROGRESS MONITORING

TECHNICAL FIELD OF THE INVENTION

The present invention relates to a method for use in developing, testing, debugging, and/or troubleshooting a call progress monitoring (CPM) detection system which is utilized, for example, by a voice messaging system (VMS).

BACKGROUND OF THE INVENTION

In international and domestic telephony there is a vast array of call progress monitoring (CPM) tones, which tones vary quite a bit depending on factors such as, geographic location, type of private business exchange (PBX), and so forth. This situation renders the job of making and troubleshooting CPM detection system for use with a voice messaging system (VMS) which can detect this vast array of CPM tones very difficult. As a result, troubleshooting a CPM detection system often requires a visit to the system site by an expert on that system.

In the prior art, testing, debugging, and troubleshooting of a CPM detection system is done as follows: (a) the software of the CPM detection system reports or logs information which indicates what the CPM detection system "thought" it "heard," i.e., the output of the CPM detection system or (b) a human, using, for example, a buttset telephone, concurrently taps into a trunk connected to a voice channel and eavesdrops on what is being "heard" by the CPM detection system on the voice channel, i.e., the raw voice data or CPM tones input to the CPM detection system.

The above-described prior art methods of testing, debugging, and troubleshooting have several problems. The following is a list of some of these problems: (a) the person performing the testing, debugging, and troubleshooting is typically required to be present at the site of the VMS containing the CPM detection system; (b) the person is typically required to have a buttset telephone which is utilized to tap into a trunk connected to a voice channel—this can be extremely difficult and typically requires expertise; (c) a buttset telephone does not work with digital links or trunks—this makes troubleshooting on a system with digital links nearly impossible; (d) the person typically does not have a convenient way of recording actual CPM tones being transmitted over the voice channel; (e) the person has to troubleshoot at a pace dictated by the CPM tones and events occurring at the VMS hosting the CPM detection system; and (f) it is very difficult, if not impossible, for the person to troubleshoot on multiple voice channels concurrently.

As a result, there is a need in the art for a method for use in developing, testing, debugging, and/or troubleshooting a CPM detection system which is utilized, for example, by a VMS. Further, there is a need for such a method which: (a) can provide developing, testing, debugging, and troubleshooting on site or remotely; (b) does not require special equipment such a buttset telephone for troubleshooting; and (c) works with digital and analog trunks or links.

SUMMARY OF THE INVENTION

Embodiments of the present invention advantageously satisfy the above-described need in the prior art by providing a method for use in developing, testing, debugging, and/or troubleshooting a call progress monitoring (CPM) detection system which is utilized, for example, by a voice messaging system (VMS). In particular, an embodiment of the present invention which is utilized in conjunction with a VMS comprises the steps of: (a) monitoring at least one voice channel of the VMS to obtain CPM tones and having a CPM Detection system associated with the VMS perform an analysis of the CPM tones, the output of which analysis is referred to as CPM Trace Variables; (b) storing the CPM tones and the CPM Trace Variables for the at least one voice channel, which stored CPM tones and CPM Trace Variables are referred to as a CPM Trace file; (c) obtaining a first voice channel; and (d) feeding the voice portion of the CPM Trace file to a second voice channel for playing it to the first voice channel.

It will be understood that embodiments of the present invention may be utilized on systems other than a VMS. For example, embodiments of the present invention may be utilized, for example, in connection with apparatus which dials a telephone and listens to the line to monitor call progress tones. For example, as is well known to those of ordinary skill in the art, systems known as "predictive dialing" systems and systems known as "power dialing" systems fall into the category of systems which can utilize embodiments of the present invention.

The invention will be better understood from the following more detailed description taken with the accompanying drawings and claims.

BRIEF DESCRIPTION OF THE DRAWINGS

FIG. 4 shows examples of Trace variable displays.

Corresponding elements in each of the drawings have the same reference numbers.

DETAILED DESCRIPTION

Figure 1:
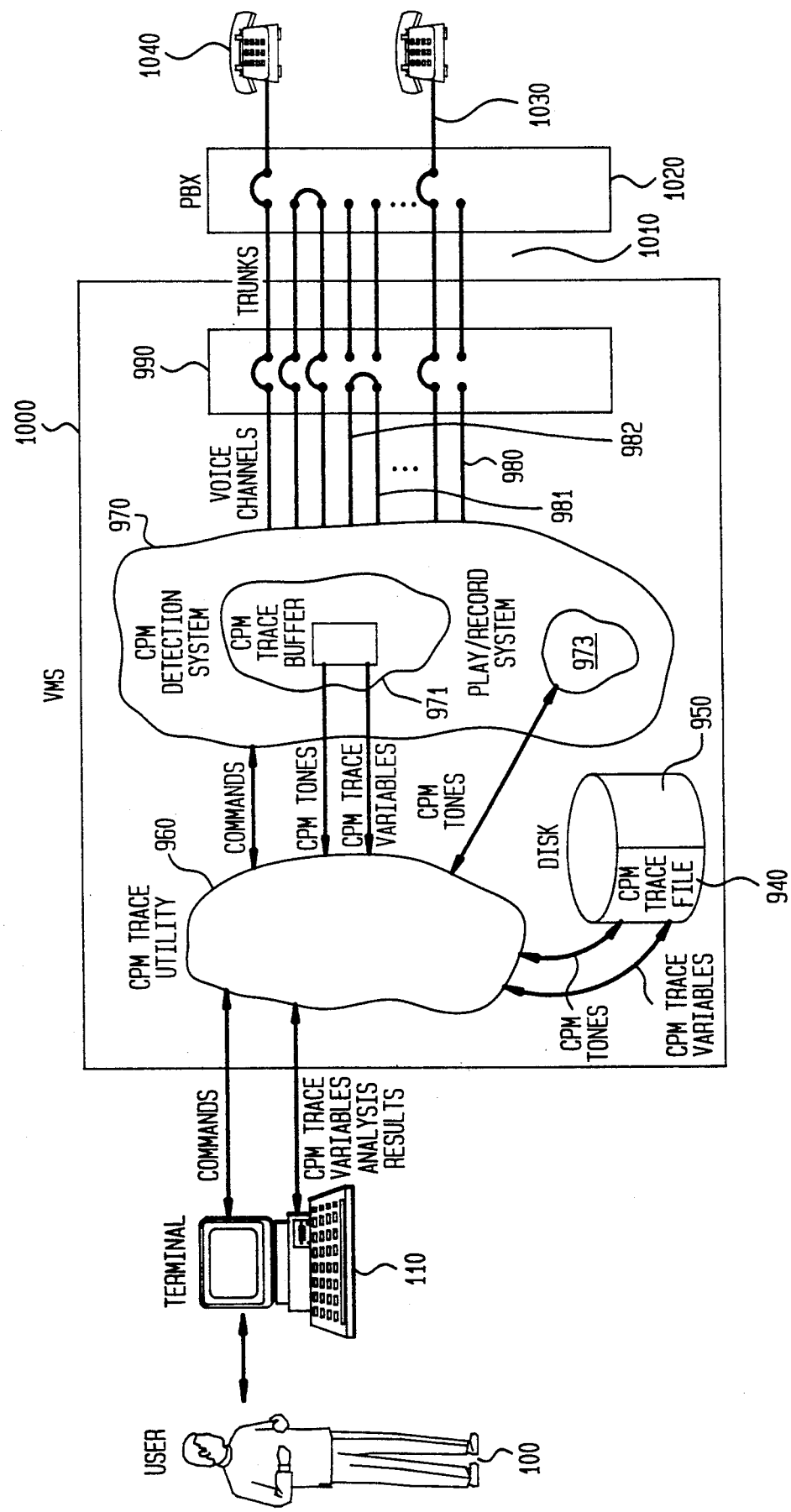
FIG. 1 shows, in pictorial form, a VMS which utilizes a CPM detection system and a CPM Trace utility which operate in accordance with the method of the present invention.

FIG. 1 shows, in pictorial form, a voice messaging system (VMS) which utilizes a call progress monitoring (CPM) detection system and a CPM Trace utility which operate in accordance with the method of the present invention. As shown in FIG. 1, user 100, for example, a person performing troubleshooting, utilizes terminal 110. Terminal 110 is a terminal which has local or remote access to voice messaging system (VMS) 1000. VMS 1000 is connected by means of trunks 1010 to private business exchange (PBX) 1020. PBX 1020 is connected by lines 1030 to calling parties 1040.

As shown in FIG. 1, VMS 1000 is comprised of equipment 990 which is well known to those of ordinary skill in the art for interfacing between trunks 1010 and voice channels 980. Further, voice channels 980 are connected to voice subsystem 970. As shown in FIG. 1, voice subsystem 970 is comprised of CPM detection system 971 and playback/record system 973. In the preferred embodiment of the present invention, CPM detection system 971 and playback/record system 973 are embodied as applications which are well known to those of ordinary skill in the art. Still further, CPM detection system 971 and playback/record system 973 interface with CPM Trace utility 960 which, in turn, interfaces with disk 950 and terminal 110.

As shown in FIG. 1, user 100 at terminal 110 can interface with CPM Trace utility 960 to cause CPM Trace utility 960 to: (a) create a CPM Trace file such as CPM Trace file 940 on disk 950; (b) to have CPM tones in CPM Trace file 940 played to a human or to one of voice channels 980; and (c) to display an analysis of CPM Trace Variables in CPM Trace file 940.

In accordance with an embodiment of the inventive method, one or more CPM Trace files is created as follows. User 100 interacts with terminal 110 to indicate to CPM Trace utility 960 to start CPM tracing on one or more voice channels. In the preferred embodiment, user 100 can specify a CPM trace mode. The CPM trace mode indicates when to start the tracing and what CPM trace data to log into each CPM Trace buffer. For example: (a) mode 1 means to start tracing on a given voice channel as soon as the order to start CPM monitoring is received and to log CPM Voice data, i.e., tones, and CPM Trace Variables data—CPM tones constitutes what CPM Detection system 971 "heard" over the given voice channel and CPM Trace Variables data indicate what CPM Detection system 971 "thought" it "heard" over the given voice channel and (b) mode 2 means to start tracing at the beginning of an outgoing call on a given voice channel.

As shown in FIG. 1, commands are transferred from CPM Trace utility 960 to CPM Detection system 971 to cause CPM Detection system 971 to transfer CPM Voice data, i.e., tones, and CPM Trace variables to CPM Trace utility 960. In accordance with the inventive method, CPM tones and CPM Trace Variables are synchronously recorded into one or more CPM Trace buffers in CPM Detection system 971 for each voice channel being traced. Then, the CPM tones and CPM Trace variables are transferred to CPM Trace utility 960 which causes them to be written into CPM Trace file 940 o disk 950 corresponding to the given voice channel. This process continues until user 100 indicates over terminal 110 to stop that tracing on the given voice channel.

Figures 2, 3:
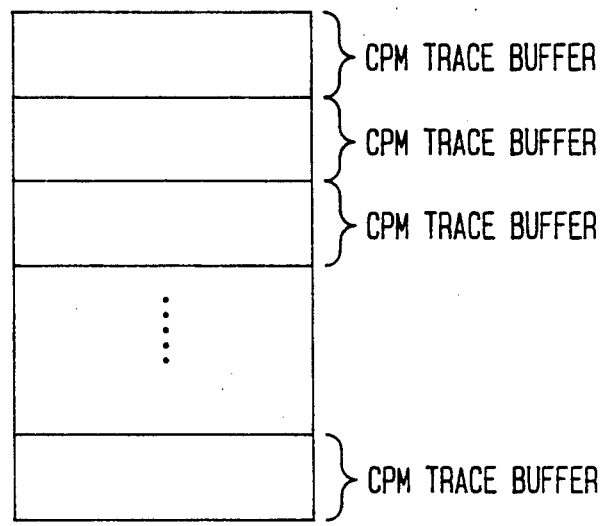
FIG. 2 shows the format of a CPM Trace file which is fabricated in accordance with the present invention.
FIG. 3 shows the format of a CPM Trace Buffer which is fabricated in accordance with the present invention.

FIG. 2 shows the format of CPM Trace file 940. As shown in FIG. 2, CPM Trace file 940 comprises copies of CPM Trace buffer which is stored in CPM Trace utility 960.

FIG. 3 shows the format of a CPM Trace buffer. As shown in FIG. 3, each block of storage comprises CPM tones representing the tones received by CPM Detection system 960 and CPM Trace variables representing the interpretation of the tone by CPM Detection system 971.

Advantageously, in accordance with the present invention, user 100 now has an option of further executing the inventive method using VMS 1000 or of transporting CPM Trace file(s) 940 from VMS 1000 to another VMS, for example, a more easily accessible and local VMS. Transportation of CPM Trace files from VMS 1000 to another VMS may be done by means of a remote file transfer which is well known to those o ordinary skill in the art or by writing these files to a diskette and transporting by, for example, having the diskette mailed to user 100 at the remote location.

In accordance with an embodiment of the inventive method, CPM tones in CPM Trace file are replayed to user 100 and the meaning of the CPM Trace Variables in the CPM Trace is displayed to user 100 on terminal 110 as follows. User 100, using terminal 110, requests CPM Trace utility 960 to play a desired CPM Trace file on a desired voice channel to a desired telephone. In response, in a manner which is well known to those of ordinary skill in the art, CPM Trace utility 960 causes VMS 1000 to place an outgoing call on the desired voice channel to the desired telephone. It should be understood that the telephone need not be co-located with VMS 1000 and can be remotely located with user 100. User 100 answers the telephone and CPM Trace utility 960 transfers the tones that comprise the voice portion of CPM Trace file 940 to playback/record system 973 and, in response, playback/record system 973 causes the tones to be played on the desired voice channel in a manner which is well known to those of ordinary skill in the art. In addition, CPM Trace utility 960 displays on terminal 110, concurrently if needed, the meaning or analysis results of the CPM Trace variables part of CPM Trace file 940.

In accordance with the present invention, the following steps are involved in playing the CPM tones in CPM Trace file 940 to a voice channel and in displaying the meaning of the CPM Trace Variables part of that file. Due to the trace buffer's method of creation, the time synchronization between the CPM Tones and the CPM Trace variables is preserved, see for example, FIG. 3. Therefore, as each new portion of the CPM Tones is given to the CPM detection system to be played out to user 100, CPM Trace utility 960 may also display on terminal 110 the CPM Trace variables associated with that portion of the CPM Tones. In this way, user 100 can simultaneously hear the CPM tones and see the CPM Trace variables.

The following steps are involved in displaying the meaning or analysis of the CPM Trace variables in a CPM Trace file. User 100 requests CPM Trace utility 960 to display the CP M Trace variables and, in making this request, user 100 can specify: (a) the type of analysis to perform (full display such as, for example, providing spectral information, timing information every 30 milliseconds, and so forth or partial display, i.e., providing only highlights) and (b) the output format of the analysis results, including various types of graphic displays which are well known to those of ordinary skill in the art. In response, CPM Trace utility 960 will perform the requested analysis and display the analysis results in a predetermined format on terminal 100 or send it to a printer (not shown). FIG. 4 shows examples of Trace variable displays.

As those of ordinary skill in the art can readily appreciate, embodiments of the present invention are advantageous for the following reasons. First, since CPM tones and CPM Trace Variables are synchronously recorded into one or more CPM Trace buffers in CPM Trace utility 960 and since the CPM Trace buffers are written into CPM Trace file 940, CPM Trace file 940 can either be transported via mail or transported via automated file transfer methods to a user at a remote site for testing, debugging, and/or trouble-shooting. As a result, the user is not required to be present at the site of the VMS containing the CPM detection system. At the remote site, the CPM Trace file is loaded onto a VMS system and the voice portion can be replayed as often as needed and the trace variables can be displayed thereby for use in troubleshooting. Second, embodiments of the present invention do not require special hardware such as, for example, a buttset telephone for troubleshooting.

Third, embodiments of the present invention work with digital and analog trunks or links.

As those of ordinary skill in the art can readily appreciate from the above, in accordance with the present invention, actual CPM tones being transmitted over a trunk or voice channel are recorded in a CPM Trace file. The CPM Trace file is then replayed by a user whenever desired, at a desired pace, and as often as needed. Further, in accordance with the present invention, a CPM Trace utility enables one to record concurrently CPM Trace data on as many voice channels as desired by creating a multiplicity of CPM Trace files.

One may advantageously utilize an embodiment of the present invention to detect a problem of CPM detection and to verify that a "fix" will correct the problem of CPM detection. In accordance with the present invention, the verification is performed by the steps of: (a) obtaining a CPM Trace file which contains CPM tone(s) that were incorrectly detected by CPM detection apparatus; (b) obtaining a first voice channel which detects CPM using a "fix"; (c) feeding the voice portion of the CPM Trace file to a second voice channel for playing it to the first voice channel; (d) determining whether the first voice channel properly detects the CPM tone(s) to ascertain that the "fix" rectifies the problem.

It will be understood that embodiments of the present invention may be utilized by systems other than a VMS. For example, embodiments of the present invention may be utilized, for example, in connection with apparatus which dials a telephone and listens to the line to monitor call progress tones. For example, as is well known to those of ordinary skill in the art, systems known a "predictive dialing" systems and systems known as "power dialing" systems fall into the category of systems which can utilize embodiments of the present invention.

It is to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A method for use in developing, testing, debugging, and/or troubleshooting a call progress monitoring (CPM) detection system which is utilized by an applications system such as, for example, a voice messaging system (VMS), the method comprising the steps of
   monitoring at least one voice channel of the applications system to obtain CPM tones and having a CPM Detection system associated with the applications system perform an analysis of the CPM tones, the output of which analysis is referred to as CPM Trace Variables;
   storing the CPM tones and the CPM Trace Variables for the at least one voice channel, which stored CPM tones and CPM Trace Variables are referred to as a CPM Trace file;
   obtaining a first voice channel; and
   feeding the voice portion of the CPM Trace file to a second voice channel for playing it to the first voice channel.

2. The method of claim 1 wherein the step of storing further comprises the steps of:
   transferring the CPM Trace file to another applications system; and the steps of obtaining and feeding comprise obtaining and feeding by the another applications system.

3. The method of claim 1 wherein the step of feeding further comprises displaying the CPM Trace Variables.

4. A method for use in developing, testing, debugging, and/or troubleshooting a call progress monitoring (CPM) detection system which is utilized by an applications system such as, for example, a voice messaging system (VMS), the method comprising the steps of:
   monitoring at least one voice channel of the applications system to obtain CPM tones and having a CPM Detection system associated with the applications system perform an analysis of the CPM tones, the output of which analysis is referred to as CPM Trace Variables;
   storing the CPM tones and the CPM Trace Variables for the at least one voice channel, which stored CPM tones and CPM Trace Variables are referred to as a CPM Trace file;
   obtaining a first voice channel; and
   feeding the voice portion of the CPM Trace file to the first voice channel for playing it to a telephone.

5. The method of claim 4 wherein the step of feeding further comprises displaying the CPM Trace Variables.

6. The method of claim 3 wherein the step of displaying further comprises the step of adjusting the specificity of the display.

7. The method of claim 5 wherein the step of displaying further comprises the step of adjusting the specificity of the display.

* * * * *